(12) United States Patent
Henricsson et al.

(10) Patent No.: US 7,832,759 B2
(45) Date of Patent: Nov. 16, 2010

(54) SIDE AIRBAG MODULE FOR A MOTOR VEHICLE

(75) Inventors: Peter Henricsson, Västra Frölunda (SE); Anders Palo, Göteborg (SE); Jonas Svantesson, Alingsas (SE)

(73) Assignee: Autoliv Development AB, Vargarda (SE)

( * ) Notice: Subject to any disclaimer, the term of this patent is extended or adjusted under 35 U.S.C. 154(b) by 692 days.

(21) Appl. No.: 11/664,189

(22) PCT Filed: Sep. 28, 2005

(86) PCT No.: PCT/EP2005/010482

§ 371 (c)(1),
(2), (4) Date: Aug. 15, 2007

(87) PCT Pub. No.: WO2006/037536

PCT Pub. Date: Apr. 13, 2006

(65) Prior Publication Data

US 2008/0079247 A1   Apr. 3, 2008

(30) Foreign Application Priority Data

Oct. 4, 2004   (DE) .................... 10 2004 048 250

(51) Int. Cl.
*B60R 21/21* (2006.01)
*B60R 21/233* (2006.01)

(52) U.S. Cl. .................... 280/729; 280/730.2
(58) Field of Classification Search .......... 280/729, 280/730.2, 740
See application file for complete search history.

(56) References Cited

U.S. PATENT DOCUMENTS

| | | | |
|---|---|---|---|
| 3,598,159 A * | 8/1971 | MacIntyre | 139/384 R |
| 4,966,388 A | 10/1990 | Warner et al. | |
| 5,316,336 A | 5/1994 | Taguchi et al. | |
| 5,364,125 A | 11/1994 | Brown et al. | |
| 5,464,250 A * | 11/1995 | Sato | 280/743.1 |
| 6,199,898 B1 * | 3/2001 | Masuda et al. | 280/730.2 |
| 6,293,581 B1 | 9/2001 | Saita et al. | |
| 6,398,253 B1 * | 6/2002 | Heigl | 280/729 |
| 6,471,240 B2 * | 10/2002 | Bakhsh et al. | 280/729 |
| 6,742,805 B2 * | 6/2004 | Hill | 280/730.2 |
| 6,755,436 B2 * | 6/2004 | Hess et al. | 280/730.2 |
| 6,820,893 B2 * | 11/2004 | Tanase et al. | 280/730.2 |
| 6,832,776 B1 * | 12/2004 | Soderstrom | 280/730.1 |

(Continued)

FOREIGN PATENT DOCUMENTS

DE   42 23 620 A1   1/1993

*Primary Examiner*—Paul N Dickson
*Assistant Examiner*—Laura Freedman
(74) *Attorney, Agent, or Firm*—Brinks Hofer Gilson & Lione

(57) ABSTRACT

A side impact airbag module for a motor vehicle having an airbag. The airbag is inflatable by a gas generator and unfolds in a flat fashion. The gas generator is connected with the airbag by a feed tube. The airbag module is designed for installation in a door of the motor vehicle. The side airbag module includes a feed tube that has two gas outlet openings or gas outlet areas spaced at a distance from one another, and situated in the area of where the end airbag chambers are formed. The end airbag chambers have filling openings that are situated immediately above the gas outlet openings of the feed tube. The airbag has one or more middle chambers connected for gas flow between the end chambers.

7 Claims, 3 Drawing Sheets

U.S. PATENT DOCUMENTS

| | | | |
|---|---|---|---|
| 7,025,375 B2 * | 4/2006 | Drossler et al. | 280/729 |
| 7,083,189 B2 * | 8/2006 | Ogata | 280/730.2 |
| 7,192,050 B2 * | 3/2007 | Sato et al. | 280/729 |
| 7,213,836 B2 * | 5/2007 | Coon et al. | 280/730.2 |
| 7,441,798 B2 * | 10/2008 | Kim | 280/730.2 |
| 7,661,702 B2 * | 2/2010 | Ochiai et al. | 280/730.2 |
| 2004/0075257 A1 | 4/2004 | Ogawa et al. | |
| 2004/0164528 A1 | 8/2004 | Boegge et al. | |
| 2004/0256842 A1 * | 12/2004 | Breed | 280/730.1 |
| 2006/0043702 A1 * | 3/2006 | Jamison | 280/729 |
| 2006/0163849 A1 * | 7/2006 | Keshavaraj | 280/730.2 |

\* cited by examiner

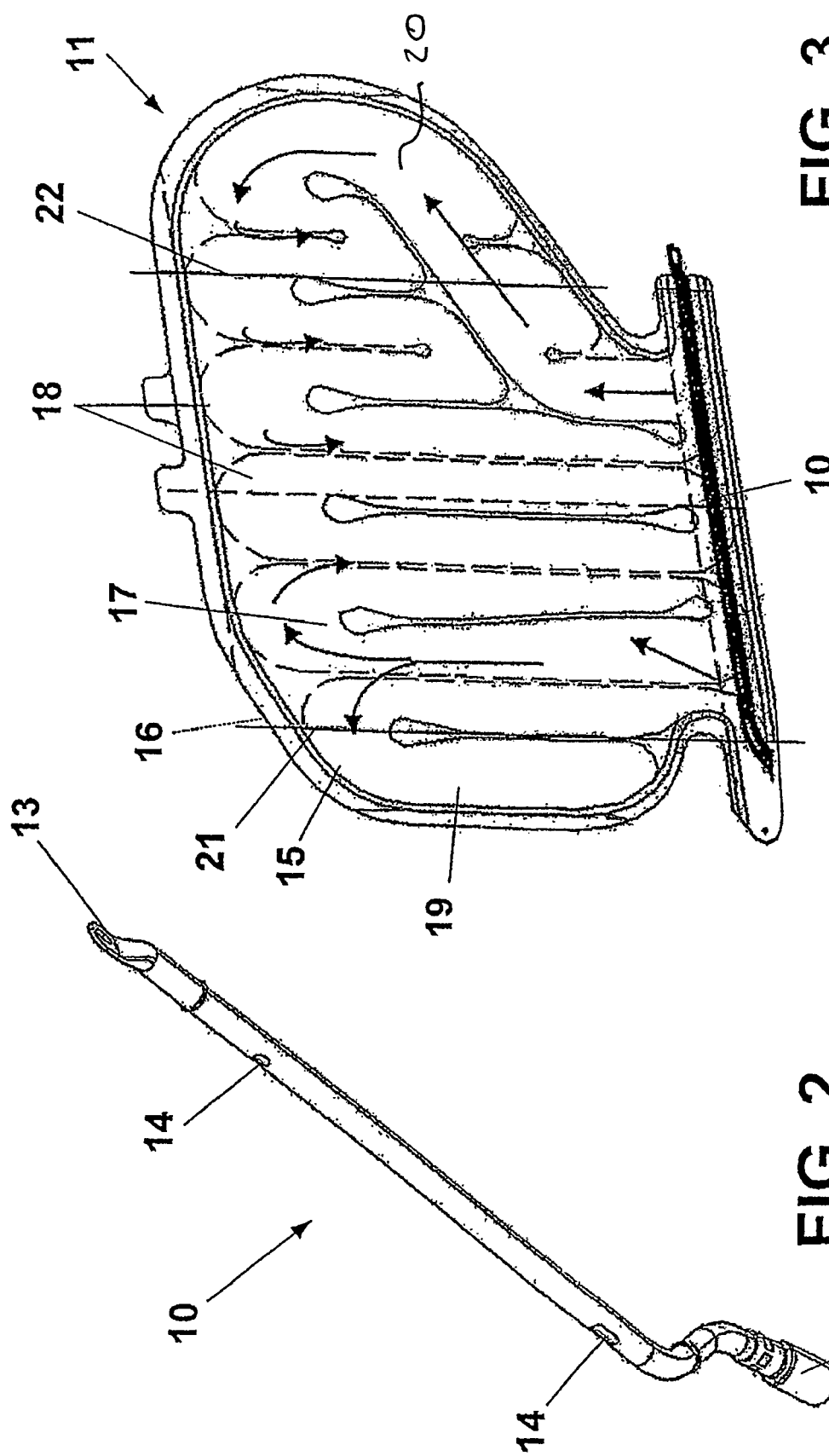

SIDE AIRBAG MODULE FOR A MOTOR VEHICLE

CROSS REFERENCE TO RELATED APPLICATIONS

This application claims priority to DE 10 2004 048 250.0 filed Oct. 4, 2004 and PCT/EP2005/010482 filed Sep. 28, 2005.

FIELD OF THE INVENTION

The invention relates to a side airbag module for a motor vehicle, with an airbag which is inflatable by means of a gas generator and which unfolds in a flat fashion, in which the gas generator is connected with the airbag by means of a feed tube, and in which this side airbag module is designed for installation into a door rail of a motor vehicle.

BACKGROUND OF THE INVENTION

Safety systems are known which are intended to protect a person sitting in a motor vehicle in case of a sudden deceleration of the travel movement, which for example occur in case of a vehicle impact against a fixed object, when the person sitting in the vehicle is flung contrary to the deceleration movement against a structure located in the vehicle, for example the instrument panel, the front seat, the side wall etc. Without the safety restraint systems, this often leads to serious injuries of the vehicle occupant(s), particularly when no adequate protection is present in particular for the head and the thorax of the vehicle occupants.

Known safety restraint systems include safety belts and airbag devices. An airbag device, as is known, comprises an inflatable airbag, which is accommodated for example, in the steering wheel hub cover, in the instrument panel and/or in the side wall interior panels of the motor vehicle. In case of collision of the vehicle against a fixed resistance, an acceleration sensor activates a gas generator, which is ignited within an extremely short time and inflates the airbag with filling gas. During deployment, the cover or the trim panel tears open at a defined point and clears the path for the airbag which is filling with gas. The vehicle occupant then sinks into the airbag, which considerably decreases the load which occurs during the sudden deceleration of the vehicle movement.

Side impact airbags are used more and more frequently in modern motor vehicles. In case of an impact of the motor vehicle, the airbag is suddenly filled with gas, if for example sudden lateral acceleration occurs.

One example of an airbag device for a motor vehicle is known from U.S. Pat. No. 4,966,388, in which an airbag is located in a side door at the side of a vehicle occupant, whereby the airbag is inflated by a gas generator if a side collision is detected, so that the inflated airbag takes up a space between the side door of the vehicle and the vehicle occupants.

Furthermore, in DE 42 23 620 A1, a side airbag device for a motor vehicle is described in which a gas-generating material is accommodated in an inflating device for the airbag, which is ignited if a sensor detects an impact, whereby a large volume of gas is released and streams into a gas outlet conduit. As, in general, the gas generator is outside the airbag, a gas outlet conduit, a gas lance or a feed tube is necessary, in order to convey the gas into the airbag. The upper side of the gas outlet conduit of this known side airbag device is provided with a large number of nozzles from which the gas streams into the airbag, in order to inflate it.

Furthermore, the airbag, especially according to DE 42 23 620 A1 and in general, consists of two fabric layers, whose circumferential edges are connected with each other, for example by sewing and/or bonding. The gas which exits from a large number of nozzles in the gas outlet conduit therefore enters the volume of the airbag which is formed of both fabric layers and which inflates in the form of a cushion, both suddenly and completely.

SUMMARY OF THE INVENTION

This invention is based on the task of creating a side impact airbag module and an airbag of the type mentioned above which enables filling of the airbag which is staged over time, in other words sectional or sequential filling of the airbag.

This invention is based on the recognition that sectional filling of the airbag of a particular frame-like form creates a stronger air or gas cushion, in order to achieve greater restraint of the vehicle occupants in case of accident, even if in particular the head of the occupants is in a so-called "out of position" situation, in other words, is outside the normal occupant position. In addition, such an airbag unfolds faster with regard to its circumferential geometry than known side airbag devices, so that it is possible to achieve a more rapid protective effect.

According to this invention a side impact airbag module is provided for a motor vehicle with an airbag which is inflatable by a gas generator and which unfolds flat, in which the gas generator is connected with the airbag by means of a feed tube, and the side airbag module is designed for installation in a door rail of the motor vehicle.

In order to address the design requirements, it is also provided that the feed tube has two gas outlet openings or gas opening areas spaced at a distance to one another, that in the area of the start and the end of the longitudinal extension of the airbag, airbag chambers are formed, whose filling openings are located immediately above the gas outlet openings, spaced at a distance to one another, of the feed tube, and that the airbag chambers of the airbag which lie in the edge area are connected from the point of view of flow with the space of the airbag which lies between.

When such a side airbag in accordance with this invention is triggered, first the outer chambers as seen from the direction of travel, which surround the central area of the airbag in the form of a frame, and then the space of the airbag which lies in between is filled with gas generated by the gas generator. This gas is conveyed onwards via the feed tube with the two gas outlet openings spaced at a distance from one another. The spaced gas outlet openings are preferably formed in the area of the axial ends of the feed tube and are connected from the point of view of flow with the airbag chambers lying in the edge area of the airbag.

The inflation gas is preferably conveyed on in those areas of the airbag which in the unfolded state of the airbag are furthest from the feed tube. This means that the two outer airbag chambers are connected with each other from the point of view of flow in the area distant from the feed tube, so that a tightly filled gas chamber frame is formed rapidly after ignition of the gas generator.

By means of the measures according to the invention, filling and inflation of the airbag which is staged in terms of time, in other words which is implemented section by section, is achieved. Therefore the airbag first becomes erect through filling of its outer chambers, which means that it creates an initial protective effect faster than side impact air bags of the generic type, even if the airbag chambers in the central area of the airbag are not yet completely filled. The gas cushion is built up within an extremely short period of time, whereby the several chambers formed by the fabric layers hold the gas cushion flat and reinforce it. By these means in particular the head and also the thorax area of the vehicle occupant are restrained.

According to a further development of the airbag it is provided that the airbag consists of three material layers which lie above each other, which lie above each other at the edge and are connected with one another, whereby these material layers form individual airbag chambers between the airbag edges in that the central material layer is connected alternately with the inner or the outer material layer. With regard to the connection points of the three fabric layers it is provided for that these are woven together and/or bonded with one another.

In addition, it is considered advantageous if the chambers are formed in such a way that, when they are in inflated state, are alternately domed basically crossways to the longitudinal extension of the airbag and therefore almost form a honeycomb structure in cross-section.

In addition it is preferred if the airbag chambers are formed in such a way that, when inflated state, they are basically aligned parallel to the unfolding direction of the airbag, which altogether favours fast inflation of the airbag.

Finally it is advantageous if at least one chamber of the airbag on the edge side is formed to as to run at a slant towards the outside. This slanting direction of such a chamber on the edge side ensures that the edge section of the airbag, which is folded over, already moves out during the unfolding process of the folded airbag package, so that the airbag achieves its entire longitudinal extension early on.

BRIEF DESCRIPTION OF THE DRAWING

In the following text, the invention will be described in more detail in several embodiments, using the attached drawings. The drawings are as follows:

FIG. 2 is a perspective view of a feed tube as a connection between the gas generator and the airbag, FIG. 3 is an inflated airbag of the side airbag module according to FIG. 1.

DETAILED DESCRIPTION

Figure 1:
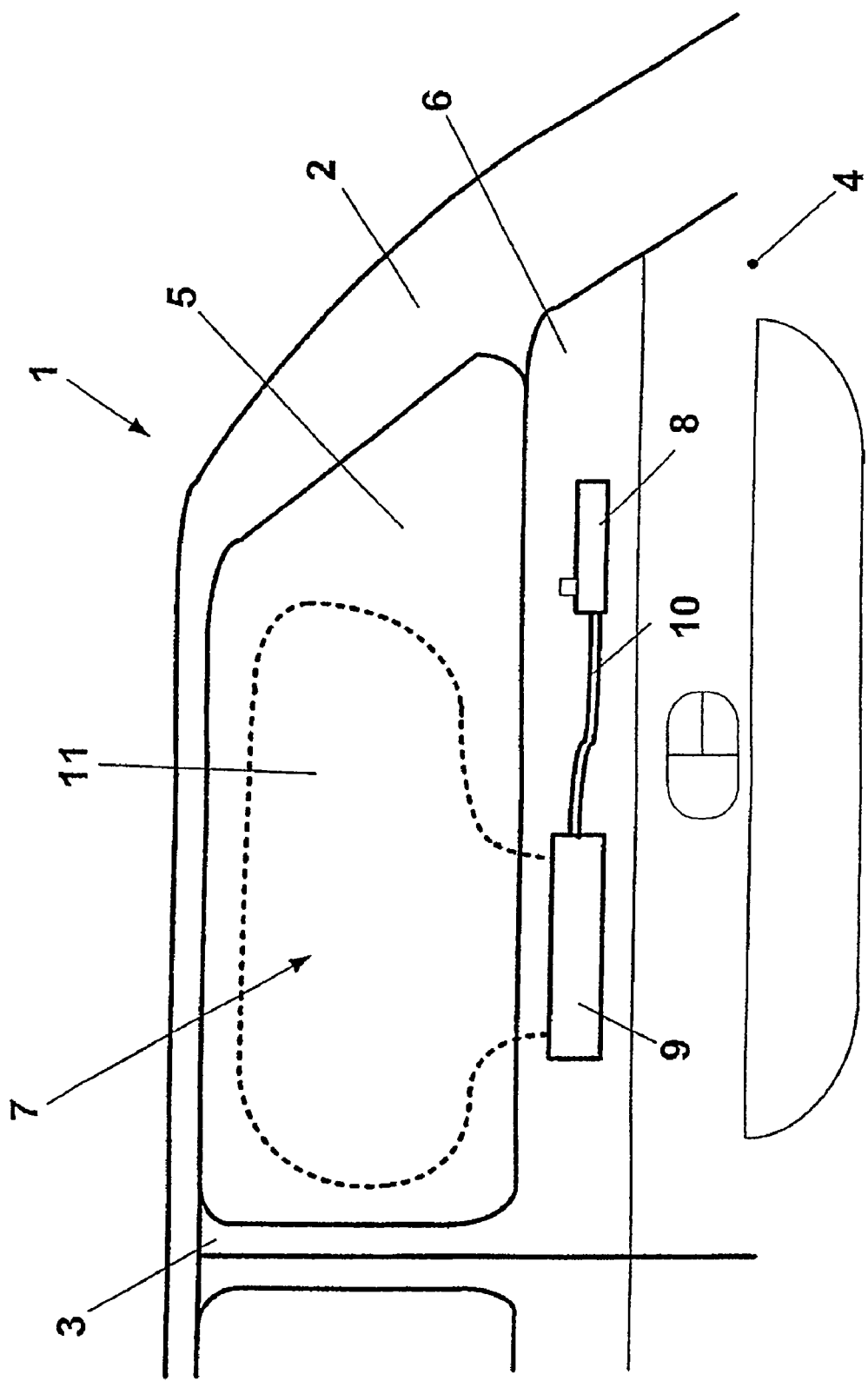
FIG. 1 is a side view of the side airbag module according to the invention in a motor vehicle with a view of the vehicle door.

Motor vehicle 1 shown in part in FIG. 1 includes an A pillar 2 and a B pillar 3, between which the area of the front vehicle seat is shown. In this seat area, there is a vehicle door 4 with door window 5 and a door rail 6 situated underneath it.

A side airbag module 7 basically consists of a gas generator 8 mounted in door rail 6 and an airbag container 9, which are connected with each other by means of feed tube 10. In case of sudden deceleration of the travel movement of motor vehicle 1 such as an impact with an obstacle and/or abrupt lateral acceleration of vehicle 1, an airbag 11 exiting from airbag container 9 is suddenly inflated by gas generated in gas generator 8 being fed into airbag 11 by means of feed tube 10.

Feed tube 10 is shown in more detail in FIG. 2 and has at one end a connecting piece 12 connecting it to the gas generator 8 and at its opposite other end a fixing clip 13 for fixing to airbag container 9 or on the structure of door 4. Near the axial ends of feed tube 10, two gas outlet openings 14 are formed, which are spaced at a distance to one another and open into airbag 11. The length and the distance between these two gas outlet openings 14 is selected in such a way that they are arranged at the two ends of the longitudinal extension of the connection area of airbag 11.

The inflated airbag 11 shown in FIG. 3 consists of three fabric layers lying one above the other, namely an outer fabric layer 15, an inner fabric layer 16 and a central fabric layer 17 situated between these. Fabric layers 15, 16 and 17 are woven, sewn and/or welded together with each other at the airbag side edge. Between the edges of airbag 11, individual airbag chambers 18 are formed in a central area in that the middle fabric layer 17 is connected with, preferably woven together with, the inner and outer fabric layers alternately. This structure can be seen particularly clearly in FIGS. 4 and 5.

Airbag 11 is now manufactured in such a way that the three fabric layers 15,16,17, in the area of the two ends of longitudinal extension of airbag 11, in other words seen in the direction of travel, form end chambers 19 and 20, into which one of the two outlet openings 14 of gas feed tube 10 open. For this purpose, feed tube 10 is placed in the lower section of airbag 11. The two frame-like airbag chambers 19,20 around the outer circumferential area of airbag 11 are therefore first inflated by the gas of the ignited gas generator 8 and therefore make possible comparatively fast unfolding and initial protective effect of airbag 11, even before chambers 18 of the central area of airbag 11 have completely filled. In addition, it can be seen in FIG. 3, that all chambers 18,19 and 20 are linked with each other from the point of view of gas flow. Filling of the central chambers 18 is therefore implemented by means of the two chambers 19 and 20 located at the edge of the airbag.

At least chamber 20 runs in its lower area rather at a slant or almost parallel to feed tube 10. This orientation serves to unfold airbag 11 quickly. Airbag 11 exhibits two folding axes 21 and 22, which run parallel to the extension area of the airbag. The airbag is folded over with its front and rear section at these folds axes 21, 22, in order to keep the folded package or the airbag container as small as possible.

The slanting orientation of chamber 20 ensures that the folded-over edge section already moves out of the airbag package generally folded together in Z-fold or roll fold during the unfolding process, so that the airbag achieves its entire longitudinal extension at an early stage. In the embodiment shown in FIG. 3, only the rear edge chamber 20 is formed at a slant in this way. According to other variants, the front chamber 19 can also be formed at a slant in this way.

Figure 4:
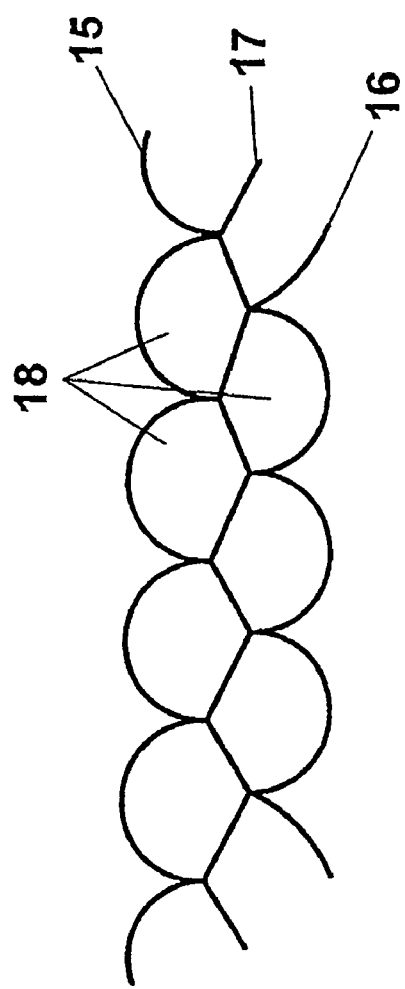
FIG. 4 is a schematic representation of a partial cross-section of the inflated airbag according to the invention in a first embodiment.
Figure 5:
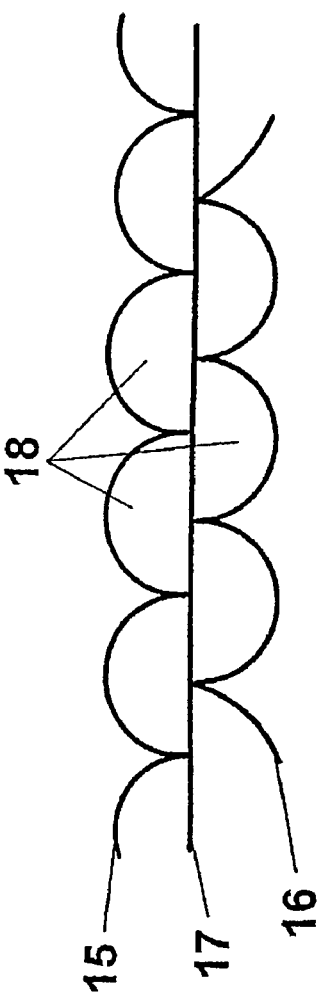
FIG. 5 is a schematic representation of a partial cross-section of the inflated airbag according to the invention in a second embodiment.

As the examples according to FIGS. 4 and 5 show, within the frame-type airbag 11 formed by outer fabric layer 15 and inner fabric layer 16, the middle fabric layer 17 is arranged in such a way and woven or bonded together with these in such a way that these three fabric layers 15,16 and 17 form honeycomb-type chambers 18 or 19 and 20.

While the above description constitutes the preferred embodiment of the present invention, it will be appreciated that the invention is susceptible to modification, variation and change without departing from the proper scope and fir meaning of the accompanying claims.

The invention claimed is:

1. A side impact airbag module for a motor vehicle of the type having an airbag which is inflatable by means of a gas generator and which unfolds in a flat fashion, wherein the gas generator is connected with the airbag by means of a feed tube, and wherein the side impact airbag module is adapted for installation in a door rail of a side door of the motor vehicle, the side impact airbag module comprising: the feed tube forming two gas outlet openings adjacent opposite ends of the feed tube and spaced a distance apart, the airbag forming a pair of end chambers and at least one middle chamber that is between the end chambers, the end chambers having filling openings adjacent to the feed tube gas outlet openings, such that gas from the gas outlet openings first fills and inflates the end chambers, and then inflates the middle chamber, wherein the airbag is configured as installed to unfold from an uninflated condition in a generally upward direction defining an unfolding direction when inflated to an inflated condition, and the end and middle chambers are formed such that in the inflated condition the end and middle chambers are orientated generally parallel to the unfolding direction of airbag.

2. The side impact airbag module according to claim 1, wherein the airbag formed of three fabric layers including an outer layer, an inner layer, and a middle layer, the layers lying above one another and connected with each other at a perimeter of the airbag edge, the fabric layers forming the end and middle airbag chambers of the airbag between the airbag perimeter edge in such a way that the middle fabric layer is connected alternately with the inner or outer fabric layer.

3. The side impact airbag module according to claim 2, wherein the connection of the three fabric layers is formed by stitching or bonding together.

4. The side impact airbag module according to claim 1, wherein the end and middle chambers are formed in such a way that when in the inflated condition the end and middle chambers are alternately domed in cross-section in a longitudinal extension of the airbag.

5. The side impact airbag module according to claim 1, wherein at least one end chamber is formed so as to run at a slope to the feed tube.

6. The side impact airbag module according to claim 1, wherein the feed tube forms exactly two gas outlet openings.

7. The side impact airbag module according to claim 1, wherein the middle chamber is a center-most chamber of the airbag between the end chambers and extends generally from a lower portion to an upper portion of the airbag in the inflated condition.

* * * * *